United States Patent [19]

Huber et al.

[11] 4,368,968
[45] Jan. 18, 1983

[54] PHOTOGRAPHIC APPARATUS

[75] Inventors: Leonhard Huber, Glonn; Adolf Höfler, Unterföhring; Eberhard Escales, Munich, all of Fed. Rep. of Germany

[73] Assignee: Agfa-Gevaert Aktiengesellschaft, Leverkusen, Fed. Rep. of Germany

[21] Appl. No.: 291,185

[22] Filed: Aug. 7, 1981

[30] Foreign Application Priority Data

Aug. 14, 1980 [DE] Fed. Rep. of Germany ....... 3030900

[51] Int. Cl.³ ............................................ G03B 15/05
[52] U.S. Cl. .................................... 354/133; 354/139
[58] Field of Search ............... 354/139, 149, 230, 236, 354/147, 133

[56] References Cited

U.S. PATENT DOCUMENTS 3,373,672  3/1968  Ichijo et al. .................... 354/230 X
4,114,175  9/1978  Huber et al. ........................ 354/252

FOREIGN PATENT DOCUMENTS 2603658  8/1977  Fed. Rep. of Germany ...... 354/139

*Primary Examiner*—John Gonzales
*Attorney, Agent, or Firm*—Kontler, Grimes & Battersby

[57] ABSTRACT

A camera wherein the synchronizing switch which fires the flash unit can be moved by a first lever which gradually increases the f/stop or by a second lever which constitutes the armature of the shutter-closing electromagnet, depending upon whether the first lever reaches a predetermined position corresponding to a maximum f/stop prior to deenergization of the electromagnet or vice versa. The respective lever then moves a mobile contact of the synchronizing switch against a fixed contact. The switch is opened in response to cocking of the shutter.

14 Claims, 8 Drawing Figures

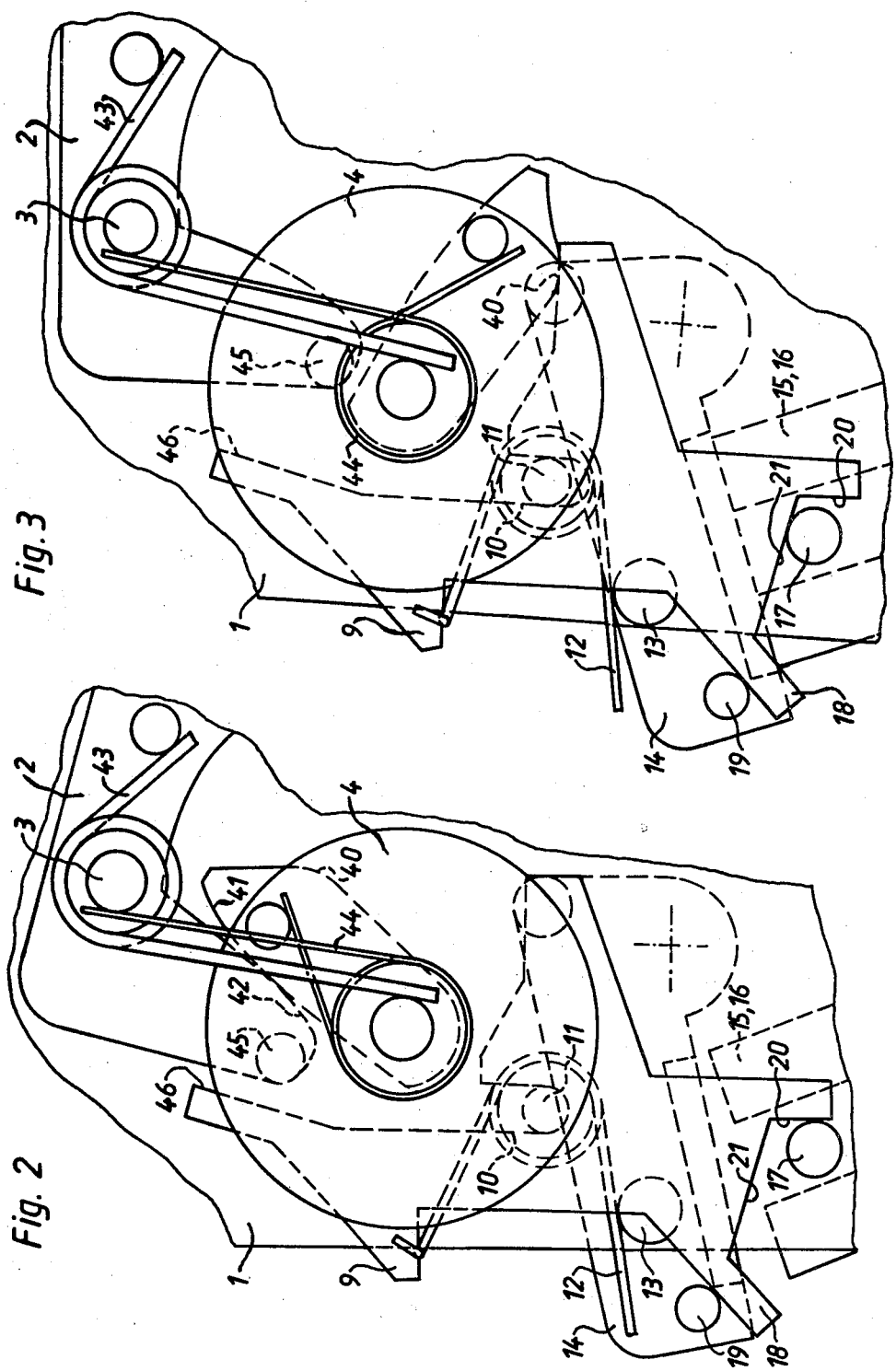

PHOTOGRAPHIC APPARATUS

BACKGROUND OF THE INVENTION

The present invention relates to photographic apparatus in general, and more particularly to improvements in photographic apparatus for use with electronic flash units or other suitable sources of artificial light. Still more particularly, the invention relates to improvements in photographic apparatus with synchronizing switches for the firing of flash units when the effective size of the light admitting opening reaches an optimum value.

OBJECTS AND SUMMARY OF THE INVENTION

An object of the invention is to provide a novel and improved photographic apparatus which is capable of making satisfactory exposures with flash irrespective of whether the exposures are made in daylight or at a time when the subject or scene is illuminated only or predominantly by artificial light.

Another object of the invention is to provide a photographic apparatus with novel and improved means for synchronizing the firing of the flash unit with the operation of means which determine the effective size of the light-admitting opening.

A further object of the invention is to provide a novel and improved synchronizing switch for use in a photographic apparatus of the above outlined character.

An additional object of the invention is to provide the photographic apparatus with novel and improved means for actuating the synchronizing switch.

Another object of the invention is to provide the photographic apparatus with novel and improved means for invariably ensuring that the synchronizing switch is closed to effect firing of the flash unit when the effective size of the light-admitting aperture reaches its maximum or optimum value.

A further object of the invention is to provide a synchronizing switch which can be used with particular advantage in photographic apparatus of the type having a variable-aperture shutter wherein the light admitting means (e.g., a diaphragm) is influenced by a delay mechanism so that, when the intensity of scene light is pronounced, the shutter is caused to close while the delay mechanism still influences the light admitting means.

An additional object of the invention is to provide a photographic apparatus of the above outlined character wherein the f/stop can be selected manually or in automatic response to ascertainment of the intensity of scene light.

Another object of the invention is to provide novel and improved means for moving one contact or one set of contacts of the synchronizing switch in a photographic apparatus of the above outlined character.

The invention is embodied in a photographic apparatus for operation with a flash unit which is fired in response to closing of a synchronizing switch. The apparatus comprises a plate-like support or analogous means which defines an opening, light admitting means (e.g., a diaphragm including two blades which are pivotable with reference to each other about a common fulcrum provided on the aforementioned support to define an aperture of desired size or an aperture which is selected automatically as a function of scene brightness) which is operable to expose at least a portion of the opening, means for operating the light admitting means including a first member (e.g., a pivotable lever which forms part of or cooperates with a suitable delay mechanism of the photographic apparatus) movable to and from a first predetermined position corresponding to the maximum rate of admission of light by way of the opening, closing means (e.g., a shutter having two vanes which are movable relative to each other and with reference to the blades of the diaphragm means) which is operable to close the opening in response to movement from its cocked position, means for operating the closing means including a second member (e.g., a lever-like armature of an electromagnet) which is movable to and from a second predetermined position to initiate the closing of the opening as a result of movement to its (second) predetermined position, and synchronizing switch means for the flash unit. The switch comprises first contact means which is preferably stationary and can be mounted on the aforementioned support, and one-piece or two-piece second contact means which is movable into engagement with the first contact means, to thereby effect the firing of the flash unit, by at least one of the operating means so that the switch means is closed when the first member reaches its predetermined position prior to movement of the second member from the second predetermined position and/or when the second member leaves its predetermined position before the first member reaches the first predetermined position.

In a presently preferred embodiment of the improved photographic apparatus, the second contact means comprises a single contact having first and second cam faces and movable angularly about as well as transversely of a predetermined axis (e.g., with reference to the axis of a guide pin which is mounted on the aforementioned support and extends into an elongated (preferably open-ended) slot of the single contact) to engage one of its cam faces with the first contact means in response to angular movement about the fixed axis and to engage the other cam face with the first contact means in response to a movement transversely of the fixed axis. One of the aforementioned members preferably serves to effect angular movements of the single contact about the fixed axis, and the other member can serve to move the single contact transversely of the predetermined axis.

The apparatus can comprise a fixed electrical terminal which is connected to one pole of the energy source for the flash unit, and such one pole of the energy source is connected with the flash unit in response to engagement of the second contact means with the first contact means. In accordance with a feature of the invention, the apparatus comprises a torsion spring or other suitable current-conducting resilient means which normally urges the second contact means against the first contact means and which normally establishes an electrical connection between the terminal and the second contact means. Thus, engagement of the second contact means with the first contact means will result in firing of the flash unit only when the resilient element establishes an electrical connection between the terminal and the second contact means. The means for operating the closing means preferably comprises an electromagnet having an armature which constitutes the aforementioned second member and has a portion serving to maintain the second contact means out of engagement with the first contact means against the opposition of the resilient means in energized condition of the electromagnet. The armature is provided with means (e.g., a post, a stud or an analogous projection) which disengages the resilient element from the terminal when the electromagnet is deenergized and the armature has left its (second) predetermined position. When the electromagnet is energized, the aforementioned portion (e.g., the previously referred-to post, stud or an analogous projection) bears against a lug or another suitable projection of the second contact means to maintain the latter out of engagement with the first contact means. A relatively small angular or other displacement of the armature from its predetermined position (in which the electromagnet is energized and its yoke attracts the armature) suffices to enable the resilient means to move the second contact means into engagement with the first contact means. As the armature continues to move away from its predetermined position, the post or stud disengages the resilient means from the terminal.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 illustrates a portion of the structure shown in FIG. 1, the switch being shown in closed position as a result of movement of the second member from its predetermined position;

FIG. 3 illustrates the structure of FIG. 2, with the switch shown in closed position as a result of movement of the first member to its predetermined position;

DESCRIPTION OF THE PREFERRED EMBODIMENTS

Figure 1:
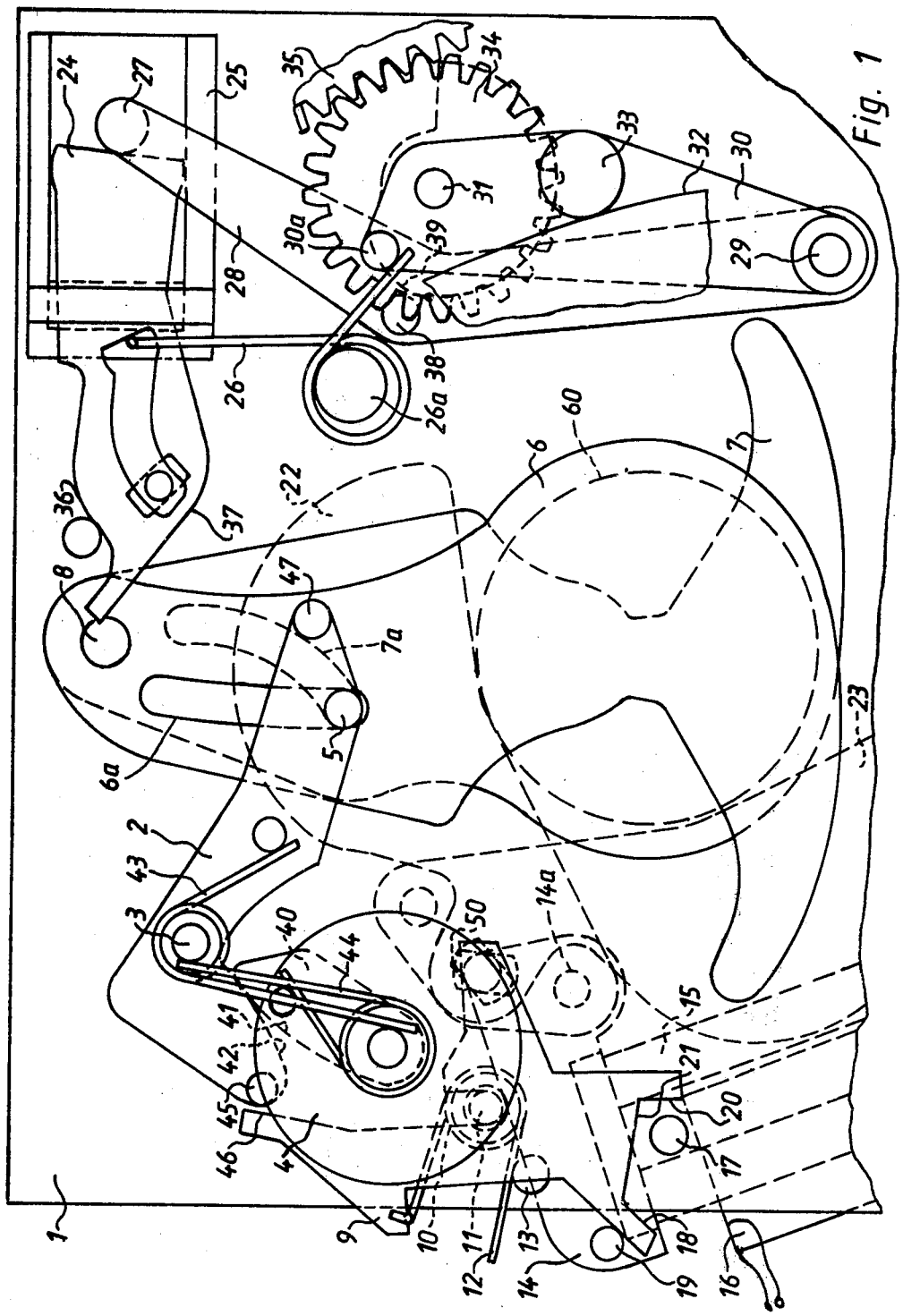
FIG. 1 is a schematic front elevational view of a portion of a photographic apparatus which embodies one form of the invention, the synchronizing switch for the flash unit being shown in the open position.

Referring first to FIG. 1, there is shown a plate-like support 1 which mounts a shaft 3 for a shutter cocking and diaphragm actuating member or lever 2. A delay mechanism 4 which is also mounted on the support 1 cooperates with the actuating lever 2 to form therewith a linkage. The right-hand arm of the lever 2, as viewed in FIG. 1, has a pin or projection 5 which extends into the suitably configurated elongated slots 6a, 7a of two diaphragm blades 6 and 7 constituting a light admitting device. The common fulcrum 8 for the blades 6 and 7 is mounted on the support 1.

The synchronizing switch which can complete the circuit of the flash unit (see FIG. 4) includes a single movable contact (second contact means) 9. This contact has an open-ended guide slot 10 for a fixed guide pin 11 on the support 1 or on another fixed component of the photographic apparatus. The arrangement is such that the contact 9 can turn about the axis of the guide pin 11 and the contact 9 is also movable transversely of the pin 11, i.e., the slot 10 can move relative to the pin. A current-conducting element in the form of a torsion spring 12 is provided to bias the contact 9 in a clockwise direction, as viewed in FIG. 1, i.e., to turn the contact 9 about the axis of the pin 11. The upper leg of the torsion spring 12 bears against a portion of the contact 9, and the lower leg of this spring normally bears against a stationary current-conducting post 13 on the support 1. One or more convolutions of the torsion spring 12 spacedly surround the guide pin 11.

The reference character 14 denotes a pivotable lever-like armature or member forming part of an electromagnet 15 whose winding is shown at 16. When the electromagnet 15 is energized, its yoke attracts the armature 14 (see also FIG. 3). The latter is pivotable about a fixed pin 14a. The pin-shaped stationary contact of the aforementioned synchronizing switch for firing of the flash unit 100 is shown at 17.

The illustrated movable contact 9 is a piece of sheet metal and comprises a projection 18 (e.g., a lug) which cooperates with a projection 19 (e.g., a stud or post) of the armature 14. The projection 19 holds the movable contact 9 against pivotal movement under the action of the torsion spring 12 when the projection 19 engages the lug 18. The switch including the contacts 9 and 17 is then open (note FIG. 1). That portion of the movable contact 9 which is adjacent to the projection or lug 18 has two mutually inclined cam faces 20 and 21 (e.g., two edge faces of the aforementioned piece of sheet metal) which make an angle of approximately 90 degrees.

The opening closing means or shutter of the improved photographic apparatus comprises two lamellae or vanes 22 and 23. The light-admitting opening of the support 1 is shown at 60.

A reciprocable stop 24 for the blades 6 and 7 of the diaphragm is mounted on a bearing member 25 of the support 1. A torsion spring 26 is mounted on a post 26a of the support 1 and one of its legs bears against the stop 24 which, in turn, bears against a pin-shaped wiper 27 provided at the upper end of a control lever 28. The lower end portion of the control lever 28 is pivotally mounted on a shaft 29 which, in turn, is mounted on an adjustable tracking lever 30 pivotable on a fixed shaft 31 of the support 1. The angular position of the control lever 28 is a function of the guide member, and such guide member is selected by a cam 32 which is calibrated in DIN (or other desired) norms. The tracking lever 30 has a roller follower 33 which tracks the cam 32. A gear 34 meshes with a ring-shaped focusing device 35 of the photographic apparatus. The gear 34 is rotatable on the shaft 31, and the tracking lever 30 has a post 30a for the other leg of the torsion spring 26. The latter ensures that the follower 33 bears against the selector cam 32. The angular position of the control lever 28 is dependent on two cams (namely, the aforementioned cam 32 and a focusing cam 39 on the gear 34) each of which can be calculated and configurated independently of the other; this brings about the advantage that the pin-shaped wiper 27 can transmit to the stop 24 a linear movement. Identical increments of linear displacement of the stop 24 correspond to identical f/stops. This is desirable and necessary because the dependency of movement of the stop 24 to obtain the required f/stops as a function of the guide number is different from the movement which the stop 24 must perform to obtain the required f/stops as a function of focusing through the medium of the ring 35. The configuration of two cam faces 36 and 37 on the stop 24 is such that they compensate for the non-linear relationship between the f/stops and the distances covered by the lever 2, the just mentioned relationship being a function of the geometry of the lever 2. In the illustrated embodiment, adjustment of the control lever 28 in dependency on the selected DIN norm (cam 32) entails a corresponding displacement of the control lever 28 with reference to the focusing cam 39 on the gear 34. As shown in FIG. 1, the control lever 28 has a pin-shaped follower 38 which tracks the focusing cam 39.

The cam 39 is a disc which forms part of or rotates with the gear 34 in response to rotation of the focusing ring 35. The movement which the cam 39 imparts to the control lever 28 is relatively small and, therefore, the error or deviation which arises as a result of rotation of the gear 34 is negligible.

When the shutter is released, the camera release is disengaged from the diaphragm actuating lever 2 and armature 14. This enables the lever 2 to effect an opening of the diaphragm by appropriate pivoting of the blades 6 and 7 via pin 5. The armature 14 is released by the yoke of the electromagnet 15 after elapse of a predetermined interval of time which is dependent on the intensity of scene light, i.e., the armature 14 can pivot clockwise as soon as the winding 16 of the electromagnet 15 is deenergized.

The delay mechanism 4 cooperates with or comprises a lever or member 40 which has a specially designed cam face 41. The lever 2 has a cam face 42 which is in engagement with the cam face 41 during opening of the shutter. A torsion spring 43 which reacts against the lever 2 tends to turn the member or lever 40 in a counterclockwise direction, as viewed in FIG. 1. A further torsion spring 44 bears upon the delay mechanism 4 and reacts against the shaft 3. The lever 2 is formed with an extension or protuberance 45 (e.g., a pin or post) which is relatively close to the contact 9 and pivots the latter in a counterclockwise direction by way of a cam 46 when the lever 2 cocks the shutter. Such movement of the contact 9 under the action of the lever 2 interrupts the connection between the cam face 20 and the contact 17.

A pin 47 on the lever 2 cooperates or can cooperate with the cam 37 of the stop 24.

Figure 5:
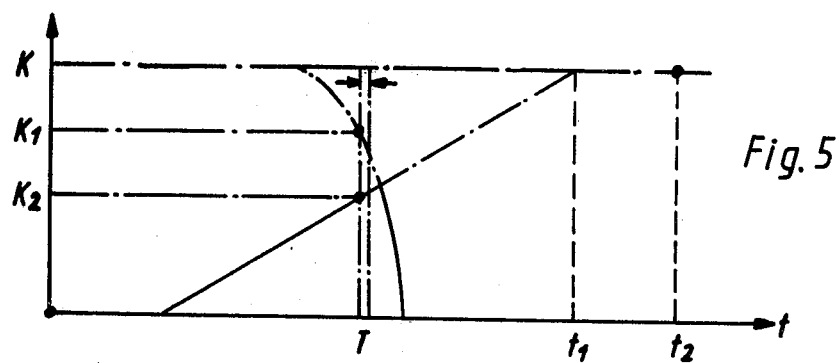
FIG. 5 is a diagram showing the effective size of the light-admitting opening at the time when the flash unit is fired in response to movement of the movable contact means under the action of the second member from its predetermined position.

Referring to FIG. 2, the synchronizing switch is closed by engaging the cam face 20 of the plate-like movable contact 9 with the stationary contact 17 when the armature 14 is disengaged from the electromagnet 15. Such movement of the armature 14 takes place during closing of the shutter, i.e., shortly after the armature 14 begins to move away from the predetermined position shown in FIG. 1. The lever 2 is acted upon by the delay mechanism 4 and its cam face 42 slides along the cam face 41 of the lever 40. This stage of operation of the photographic apparatus is represented by the diaphragm of FIG. 5. At the instant T, the movable contact 9 engages the fixed contact 17 to close the synchronizing switch for the flash unit 100, i.e., the flash unit 100 is fired. The vanes 22 and 23 of the shutter then establish an effective light-admitting opening whose size equals K1. However, the actual diaphragm aperture (f/stop) which is defined by the blades 6 and 7 is smaller because the size of such aperture then equals K2 which is less than K1. The blades 6 and 7 define an f/stop or aperture K of maximum size at the instant t1. At the instant t2, the delay mechanism 40 has assumed its end position with the result that the lever 40 has pushed the movable contact 9 downwardly, as viewed in FIG. 1 or 2, so that the contact 17 then engages the cam face 20 as well as the cam face 21.

As the armature 14 continues to pivot away from the yoke of the electromagnet 15, the projection 19 engages the lower leg of the spring 12 and pivots such leg in a clockwise direction, as viewed in FIG. 2. This interrupts the contact between the just mentioned lower leg of the spring 12 and the stationary terminal or post 13. Thus, once the armature 14 is disengaged from the electromagnet 15, the establishment of renewed electrical connection between the stationary contact 17 and the cam face 21 of the movable contact 9 is of no consequence, i.e., such engagement cannot result in firing of the flash unit 100 because the spring 12 does not connect the post 13 with the movable contact 9.

Figure 6:
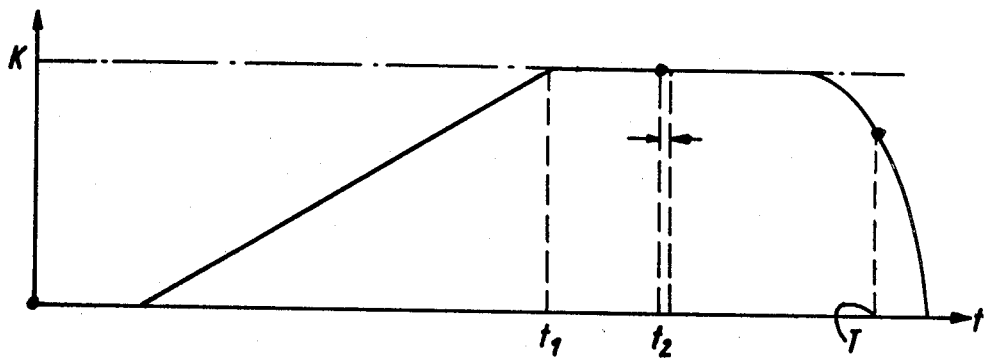
FIG. 6 is a similar diagram but showing the timing of closing of the synchronizing switch when the movable contact means is displaced by the first member.

FIG. 3 illustrates the lever 2 in an end position. The same holds true for the lever 40 of the escapement mechanism 4. The lever (first member) 40 assumes the predetermined position of FIG. 3 under the action of the lever 2 and of the mass of the delay mechanism 4. The slot 10 of the movable contact 9 is moved downwardly with reference to the guide pin 11 whereby the cam face 21 of the contact 9 engages the contact 17. The armature 14 is still attracted by the electromagnet 15. Such situation arises when the intensity of scene light is low (see FIG. 6) so that the shutter K closes at the instant T only after the diaphragm blades 6, 7 define an aperture of maximum size (see the instant t1). The firing of the flash unit 100 takes place at the instant t2, i.e., before the electromagnet 15 is deenergized so that the armature 14 still dwells in the (predetermined) position of FIG. 3 while the lever 40 assumes the (predetermined) position in which it causes the cam face 21 to engage the fixed contact 17.

Figure 4:
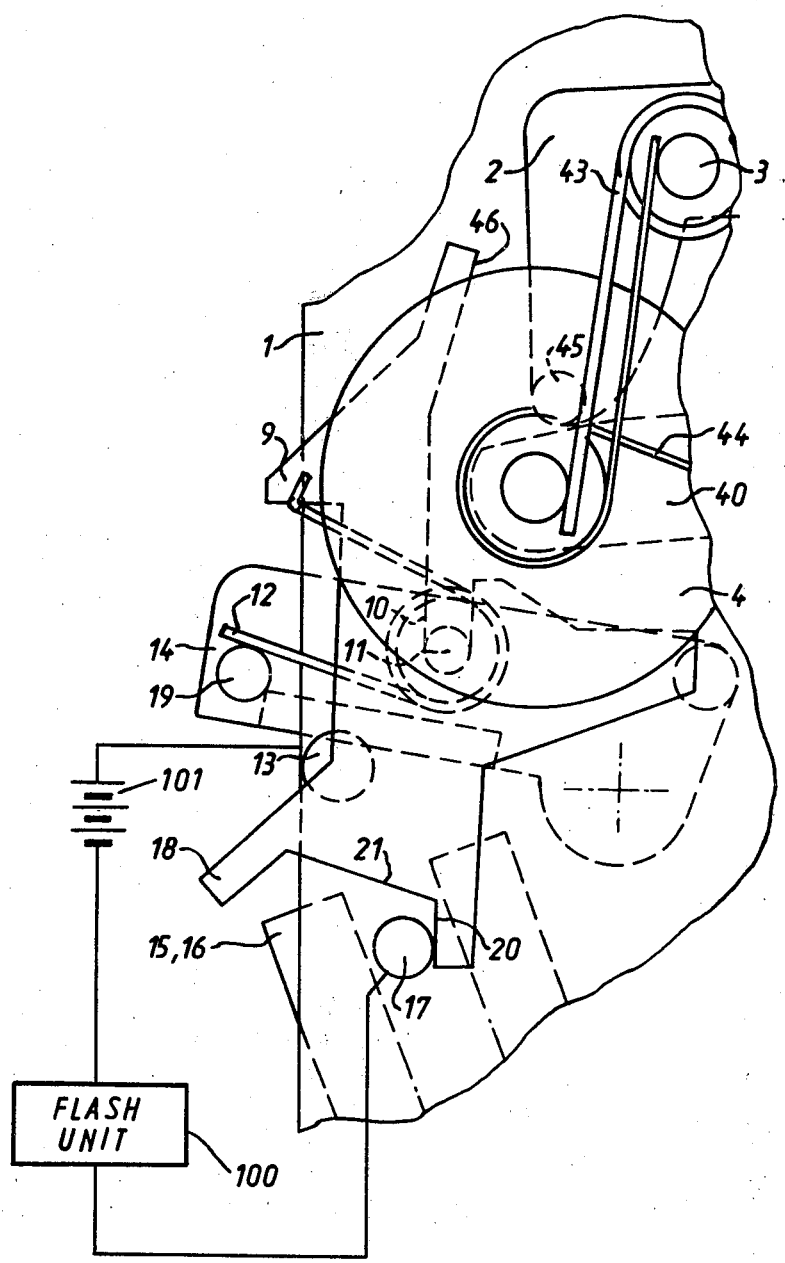
FIG. 4 shows the structure of FIG. 2 or 3, with the switch shown in closed position but without firing the flash unit.

FIG. 4 illustrates that stage when the armature 14 is moved at a maximum distance from the winding 16 of the electromagnet 15, i.e., when the lower leg of the torsion spring 12 is disengaged from the post 13 and bears against the projection 19 of the armature 14. This means that the lever 40 cannot cause or initiate closing of the synchronizing switch because the switch was already closed during the initial stage of movement of the armature 14 from the (predetermined) position of FIG. 1.

Figure 7:
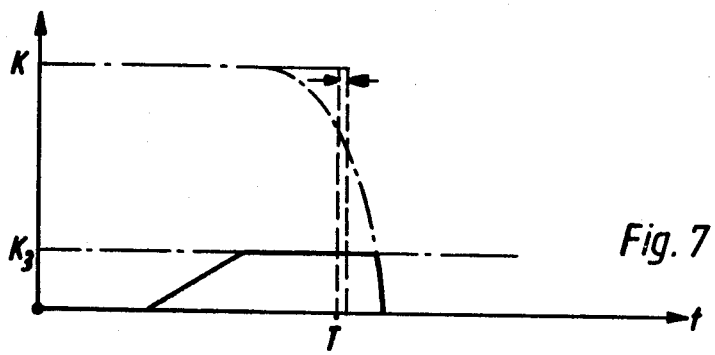
FIG. 7 is a diagram showing the timing of closing of the synchronizing switch on manual selection of the aperture when the intensity of scene light is high.
Figure 8:
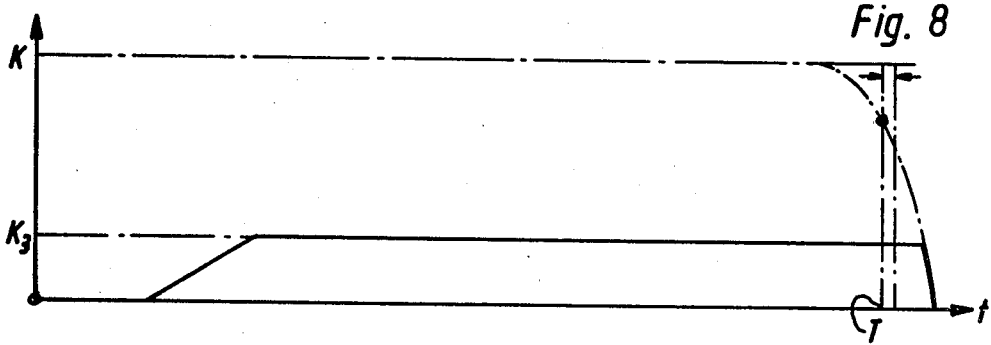
FIG. 8 is a similar diagram but showing the timing of firing of the flash unit in response to manual selection of the aperture when the intensity of scene light is low.

The diagrams of FIGS. 7 and 8 illustrate that mode of operation when the operator manually selects an f/stop K3 which is less than the maximum aperture size K. This means that the stop 24 maintains its cam 37 in the path of movement of the pin 47 on the lever 2. Thus, the lever 2 cannot move to its end position. The same applies for the cam faces 41, 42 and the lever 40 of the delay mechanism 4. Thus, when the manually selected f/stop K3 is smaller than the maximum aperture size K, the movable contact 9 is incapable of engaging the contact 17 in a manner as shown in FIG. 3. Therefore, the flash unit is fired only after the armature 14 is disengaged from the yoke of the electromagnet 15 at the instant T.

In each of the four diagrams shown in FIGS. 5, 6, 7 and 8, time (t) is measured along the abscissa and the f/stops are measured along the ordinate.

The improved photographic apparatus can be used with advantage to fire the flash unit 100 while the user of the apparatus makes an exposure in daylight or to fire the flash unit when a subject or scene is illuminated exclusively or almost exclusively by one or more sources of artificial light. The movable contact 9 engages the fixed contact 17 when the effective size of the light-admitting opening 60 reaches a maximum value. This is particularly important in photographic apparatus with variable-aperture shutters wherein the light-admitting means (diaphragm 6, 7) is influenced by a delay mechanism so that, when the intensity of scene light is relatively high, the shutter 22, 23 closes while the light-admitting means is still influenced by the delay mechanism.

The synchronizing switch could be provided with several movable contacts one of which is influenced by the (first) member or lever 40 of the delay mechanism 40 and the other of which is influenced by the armature (second member) 14 of the electromagnet 15. This would mean that one of the movable contacts would be moved against the fixed contact 17 to fire the flash unit 100 when the lever 40 of the light-admitting means reaches its predetermined end position and the other movable contact would engage the fixed contact 17 to fire the flash unit 100 when the member 14 of the closing means (14–16) leaves its predetermined position (namely, the position which the member 14 assumes when the electromagnet 15 is energized) to effect a firing of the flash unit at or prior to the start of the closing operation. If the synchronizing switch comprises two movable contacts each of which can effect firing of the flash unit 100 in response to movement against the fixed contact 17, the closing of synchronizing switch is effected by that member (40 or 14) which is first to act upon the respective one of the two movable contacts. For example, if the photographic apparatus embodies a conventional shutter with shutter opening means which can reach its end position without any delay, the synchronizing switch is always closed by such shutter opening means because the corresponding movable contact is moved against the fixed contact ahead of the other movable contact. However, if the photographic apparatus is designed in such a way that, when the user wishes to manually select a certain f/stop, an abutment or stop is placed into the path of movement of the light-admitting means so that the light-admitting means performs the function of an adjustable diaphragm, the light-admitting means is incapable of reaching its end position. Therefore, and under the just outlined circumstances, the light-admitting means is incapable of closing the synchronizing switch for the flash unit 100. In such instances, the other movable contact is actuated by the means for operating the closing means to close the synchronizing switch by moving into engagement with the fixed contact 17 of the switch.

If the light-admitting means is acted upon by a delay mechanism (in a manner known from the art of cameras with variable aperture shutters), the light-admitting means reaches its end position after the closing means is released to close the opening 60. Such situation will arise when the flash unit 100 is used to provide artificial light for one or more selected portions of one or more subjects during the making of exposures in daylight. In such instances, the synchronizing switch is closed simultaneously or substantially simultaneously with the initial stage of release of the closing means.

The illustrated embodiment exhibits the advantage that the just discussed plural movable contacts of the synchronizing switch can be replaced with a single movable contact 9 which is movable against the fixed contact 17 by the lever 40 (i.e., by a member of the light-admitting means) and/or by the armature 14 (i.e., by a member of the means for closing the opening 60). The utilization of a single movable contact contributes to simplicity and compactness of the photographic apparatus. Also, it is not necessary to provide means for monitoring the effective size of the light-admitting opening and for closing the synchronizing switch at the very instant when the effective size of the opening reaches its maximum value. Such monitoring means would be particularly expensive and complex in photographic apparatus with variable-aperture shutters wherein the ascertainment of the instant when the light-admitting opening reaches a maximum or peak value (maximum f/stop) can present serious problems.

A single movable contact 9 suffices because it is or can be designed in such a way that it performs a first type of movement (namely, an angular movement about a predetermined axis defined by the fixed guide pin 11) when acted upon by one of the members 14, 40 and a second type of movement (namely, transversely of such fixed axis) in response to actuation by the other of the members 14, 40. The slot 10 of the movable contact 9 is preferably an open slot and the spring 12 is designed to urge the movable contact 9 to a position in which the guide pin 11 is received in the closed end of the slot 10 when the lever 40 is remote from the predetermined position shown in FIG. 3. The cam faces 20 and 21 are preferably formed on suitably bent portions of the movable contact 9 (i.e., on portions which extend at right angles to the plane of FIG. 1). This ensures the establishment of reliable electrical connection between the fixed contact 17 and the cam face 20 and/or 21 when the synchronizing switch is closed. The cam face 20 is moved into engagement with the fixed contact 17 in response to angular movement of the movable contact 9 about the axis of the guide pin 11 on pivoting of the armature 14 from the predetermined position of FIG. 2 to the position of FIG. 2. On the other hand, the cam face 21 is moved against the contact 17 in response to movement of the contact 9 transversely of the guide pin 11 under the action of the lever 40 of the delay mechanism 4 (see FIG. 3).

The stationary post 13 constitutes an electrical terminal which is connected with one pole of an energy source 101 for the flash unit 100 (see FIG. 4). Closing of the switch 9, 17 will result in firing of the flash unit 100 only when the contact 9 is electrically connected with the post or terminal 13, i.e., when the torsion spring 12 (which consists of conductive material) is free to engage the post 13. therefore, the flash unit 100 cannot be fired when the armature 14 assumes the angular position of FIG. 4 (even though the cam face 20 engages the fixed contact 17) because the projection 19 of the armature 14 has lifted the lower leg of the torsion spring 12 above and away from the post 13. This is advisable and advantageous because the armature 14 prevents renewed firing of the flash unit 100 on movement of the lever 40 to its predetermined position if the firing has already taken place immediately after deenergization of the electromagnet 15, i.e., as soon as the armature 14 has been pivoted from the predetermined position of FIG. 1 to the position of FIG. 2 in which the armature allows the spring 12 to pivot the contact 9 to the extent which is necessary to move the cam face 20 from the position of FIG. 1 to the position of FIG. 2, i.e., from a position of disengagement from to a position of engagement with the fixed contact 17.

The reference character 50 denotes in FIG. 1 a motion receiving pin or post which is provided on the movable contact 9 and is engaged by the lever 40 when the latter reaches the predetermined end position of FIG. 3 to thereby move the cam face 21 against the fixed contact 17 and to thus fire the flash unit 100 while the electromagnet 15 is still energized, i.e., while the armature 14 still dwells in the predetermined position of FIG. 1 or 3. When the shutter is cocked by the lever 2, the protuberance 45 on the lever 2 bears against the cam 46 of the movable contact 9 and thereby disengages the contact 9 from the contact 17.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

All details of a variable-aperture shutter which can be utilized in the photographic apparatus of the present invention are disclosed, for example, in U.S. Pat. No. 3,373,672 granted Mar. 19, 1968.

We claim:

1. In a photographic apparatus for operation with a flash unit, the combination of means defining an opening; light-admitting means operable to expose at least a portion of said opening; means for operating said light-admitting means including a first member movable to and from a predetermined position corresponding to the maximum rate of admission of light via said opening; closing means operable to close said opening; means for operating said closing means including a second member movable to and from a second predetermined position to initiate the closing of said opening as a result of movement from said second predetermined position; and synchronizing switch means for the flash unit, said switch means comprising first contact means and second contact means movable into engagement with said first contact means, to thereby effect the firing of the flash unit, by at least one of said operating means so that said switch means is closed when said first member reaches its predetermined position prior to movement of said second member from the second predetermined position or when said second member leaves its predetermined position before said first member reaches the first predetermined position.

2. The combination of claim 1, wherein said second contact means comprises a single contact having first and second cam faces and movable angularly about as well as transversely of a predetermined axis to engage one of said cam faces with said first contact means in response to angular movement and to engage the other of said cam faces with said first contact means in response to movement transversely of said axis.

3. The combination of claim 2, wherein one of said members is arranged to effect said angular movement and the other of said members is arranged to effect said transverse movement of said single contact.

4. The combination of claim 1, further comprising a fixed electrical terminal and current-conducting resilient means normally connecting said terminal with said second contact means so that said switch means can fire the flash unit only when said second contact means engages said first contact means and said resilient means connects said terminal with said second contact means.

5. The combination of claim 4, wherein said resilient means is arranged to yieldably bias said second contact means against said first contact means.

6. The combination of claim 5, wherein said means for operating said closing means includes an electromagnet and said second member is the armature of said electromagnet, said armature having a portion which maintains said second contact means out of engagement with said first contact means against the opposition of said resilient means in energized condition of said electromagnet.

7. The combination of claim 6, wherein said portion of said armature includes a first projection and said second contact means includes a second projection which is engaged by said first projection in energized condition of said electromagnet.

8. The combination of claim 5, wherein said second contact means has an elongated slot and further comprising a fixed guide member extending into said slot, said second contact means being turnable about said guide member and said second contact means being also movable transversely of said guide member under the action of said resilient means.

9. The combination of claim 8, wherein said slot has an open end and a closed end, said resilient means comprising a spring arranged to urge said second contact means to an end position in which said guide member extends into the closed end of said slot.

10. The combination of claim 1, further comprising cocking means for said closing means, including a third member movable to a third predetermined position in which said closing means is cocked, said third member comprising a portion arranged to disengage said second contact means from said first contact means in response to movement of said third member to its predetermined position.

11. The combination of claim 10, wherein said second contact means comprises a cam and said portion of said third member is a protuberance engaging said cam during movement of said third member to its predetermined position.

12. The combination of claim 1, wherein said first member is pivotable to and from said first predetermined position and said second contact means comprises a motion receiving portion and a cam face, said motion receiving portion being located in the path of movement of said first member to said first predetermined position to thereby move said cam face against said first contact means.

13. The combination of claim 12, wherein said first member is arranged to engage said motion receiving portion during the last stage of its movement to said first predetermined position.

14. The combination of claim 13, further comprising a delay mechanism including a lever which constitutes said first member.

* * * * *